United States Patent [19]
Fort et al.

[11] Patent Number: 5,465,722
[45] Date of Patent: * Nov. 14, 1995

[54] SYNTHETIC APERTURE ULTRASOUND IMAGING SYSTEM

[76] Inventors: J. Robert Fort, 24001 Muirlands, #318, El Toro, Calif. 92630; Norman S. Neidell, 315 Vanderpool, Houston, Tex. 77024; Douglas J. Morgan, 2475 El Amigo Rd., Del Mar, Calif. 92014; Phillip C. Landmeier, 1520 N. Appaloosa, Pahrump, Nev. 89041

[ * ] Notice: The portion of the term of this patent subsequent to Dec. 14, 2010, has been disclaimed.

[21] Appl. No.: 308,953

[22] Filed: Sep. 20, 1994

Related U.S. Application Data

[63] Continuation of Ser. No. 111,160, Aug. 24, 1993, abandoned, which is a continuation of Ser. No. 806,084, Dec. 11, 1991, Pat. No. 5,269,309.

[51] Int. Cl.[6] ............................................. A61B 8/00
[52] U.S. Cl. ........................ 128/661.01; 128/660.01; 73/597
[58] Field of Search ............... 128/660.01, 660.02, 128/660.06, 661.01; 73/597, 602, 625–626

[56] References Cited

U.S. PATENT DOCUMENTS

| | | |
|---|---|---|
| 2,732,906 | 1/1956 | Mayne . |
| 3,531,763 | 9/1970 | Mayne et al. . |
| 3,696,331 | 10/1972 | Guinzy et al. ............................ 367/53 |
| 3,883,725 | 5/1975 | Fort et al. ................................ 364/421 |
| 3,895,381 | 7/1975 | Kock ....................................... 342/25 |
| 4,127,034 | 11/1978 | Lederman et al. ......................... 73/626 |
| 4,201,972 | 5/1980 | Edwards et al. ........................... 367/40 |

(List continued on next page.)

FOREIGN PATENT DOCUMENTS

| | | |
|---|---|---|
| 01246 | 5/1990 | WIPO . |
| 02021 | 11/1990 | WIPO . |

OTHER PUBLICATIONS

Peterson R. A., "Seismography 1970 The Writing of the Earth Waves", (Nov. 1969), pp. 1–89.

Taner et al., "Velocity Spectra–Digital Computer Derivation and Applications of Velocity Functions", Geophysics, vol. 34, No. 6 (Dec. 1969), pp. 859–881, 20 FIGS.

"Seismic Inversion", Proceedings of the IEEE, vol. 74, No. 3, (Mar. 1986), pp. 385–528.

Jhang, Kyung–Young et al., "3–D Velocity Field Measurement Using Multiple Ultrasonic Plane Detections and High–Order Correlation Analysis", Ultrasonics, Ferroelectrics, and Frequency Control, vol. 38, No. 2 (Mar. 1991) pp. 93–99.

Smith, Stephen W., et al., "High–Speed Ultrasound Volumetric Imaging System—Part I: Transducer Design and Beam Steering", IEEE Transactions on Ultrasonics, Ferroelectrics, and Frequency Control, vol. 38, No. 2 (Mar. 1991) pp. 100–108.

(List continued on next page.)

Primary Examiner—Francis Jaworski
Attorney, Agent, or Firm—Knobbe, Martens, Olson & Bear

[57] ABSTRACT

An acoustical imaging system for producing high resolution medical images provides a method and apparatus for obtaining accurate velocity characterizations of samples within the human body, and for obtaining high resolution images of the samples by utilizing the velocity characterizations of the samples within the human body. The acoustical imaging system also provides a method and apparatus for efficient use of switching channels whereby for a transducer array having a plurality of transducer elements, a set of receiver channels which number less than the number of transducer elements in the array are assigned to a selected portion of the plurality of transducers in the array, wherein for any predetermined set of transducers symmetrically located about a selected transducer, the predetermined set equal in number to the number of receiver channels in the system, each receiver channel in the set of receiver channels is only assigned to one transducer in said predetermined sampling set.

9 Claims, 8 Drawing Sheets

U.S. PATENT DOCUMENTS

| | | | |
|---|---|---|---|
| 4,320,472 | 3/1982 | Fort | 367/79 |
| 4,325,257 | 4/1982 | Kino et al. | 73/626 |
| 4,397,186 | 8/1983 | Phelan et al. | 73/584 |
| 4,562,540 | 12/1985 | Devaney | 364/400 |
| 4,566,459 | 1/1986 | Umemura et al. | 128/660.07 |
| 4,594,662 | 6/1986 | Devaney | 364/400 |
| 4,597,292 | 7/1986 | Fujii et al. | 73/599 |
| 4,641,660 | 2/1987 | Bele | 128/661.01 |
| 4,653,000 | 3/1987 | Matsumoto | 364/413.25 |
| 4,653,505 | 3/1987 | Iinuma | 128/660.01 |
| 4,662,222 | 5/1987 | Johnson | 73/602 |
| 4,688,430 | 8/1987 | Anderson | 73/625 |
| 4,706,499 | 11/1987 | Anderson | 73/625 |
| 4,716,765 | 1/1988 | Hirama | 73/626 |
| 4,752,896 | 6/1988 | Matsumoto | 364/413.25 |
| 4,764,904 | 8/1988 | Salomonsen et al. | 367/70 |
| 4,781,199 | 11/1988 | Hirama et al. | 128/660.01 |
| 4,784,147 | 11/1988 | Moshfeghi | 128/653.1 |
| 4,815,047 | 3/1989 | Hart | 367/103 |
| 4,817,434 | 4/1989 | Anderson | 73/625 |
| 4,830,015 | 5/1989 | Okazaki | 128/660.06 |
| 4,841,489 | 6/1989 | Ozaki et al. | 367/7 |
| 4,841,492 | 6/1989 | Russell | 367/105 |
| 4,878,205 | 10/1989 | Gelchinsky | 367/61 |
| 4,888,742 | 12/1989 | Beasley | 367/53 |
| 4,917,097 | 4/1990 | Proudian et al. | 128/662.06 |
| 4,929,951 | 5/1990 | Small | 342/179 |
| 4,992,996 | 2/1991 | Wang et al. | 367/53 |
| 5,005,418 | 4/1991 | Anderson | 73/625 |
| 5,027,659 | 7/1991 | Bele et al. | 73/626 |
| 5,027,820 | 7/1991 | Pesque | 128/660.07 |
| 5,060,651 | 10/1991 | Kondo et al. | 128/660.07 |
| 5,097,709 | 3/1992 | Masuzawa et al. | 73/626 |
| 5,269,309 | 12/1993 | Fort et al. | 128/661.01 |

OTHER PUBLICATIONS

Ramm, Olaf T., et al., "High–Speed Ultrasound Volumetric Imaging System—Part II: Parallel Processing and Image Display", *IEEE Transactions on Ultrasonics, Ferroelectrics, and Frequency Control,* vol. 38, No. 2 (Mar. 1991) pp. 109–115.

FIG. 4

| R₁ | R₂ | R₃ | R₄ | R₅ | R₁ | R₂ | R₃ | R₄ | R₅ |
|----|----|----|----|----|----|----|----|----|----|
| R₆ | R₇ | R₈ | R₉ | R₁₀ | R₆ | R₇ | R₈ | R₉ | R₁₀ |
| R₁₁ | R₁₂ | R₁₃ | R₁₄ | R₁₅ | R₁₁ | R₁₂ | R₁₃ | R₁₄ | R₁₅ |
| R₁₆ | R₁₇ | R₁₈ | R₁₉ | R₂₀ | R₁₆ | R₁₇ | R₁₈ | R₁₉ | R₂₀ |
| R₂₁ | R₂₂ | R₂₃ | R₂₄ | R₂₅ | R₂₁ | R₂₂ | R₂₃ | R₂₄ | R₂₅ |
| R₁ | R₂ | R₃ | R₄ | R₅ | R₁ | R₂ | R₃ | R₄ | R₅ |
| R₆ | R₇ | R₈ | R₉ | R₁₀ | R₆ | R₇ | R₈ | R₉ | R₁₀ |
| R₁₁ | R₁₂ | R₁₃ | R₁₄ | R₁₅ | R₁₁ | R₁₂ | R₁₃ | R₁₄ | R₁₅ |
| R₁₆ | R₁₇ | R₁₈ | R₁₉ | R₂₀ | R₁₆ | R₁₇ | R₁₈ | R₁₉ | R₂₀ |
| R₂₁ | R₂₂ | R₂₃ | R₂₄ | R₂₅ | R₂₁ | R₂₂ | R₂₃ | R₂₄ | R₂₅ |

FIG. 5

SYNTHETIC APERTURE ULTRASOUND IMAGING SYSTEM

This application is a continuation of application Ser. No. 08/111,160, filed Aug. 24, 1993, and now abandoned, which is a continuation of application Ser. No. 07/806,084, filed Dec. 11, 1991, and now U.S. Pat. No. 5,269,309.

BACKGROUND OF THE INVENTION

1. Field of the Invention

The present invention relates to the field of medical ultrasound imaging. More specifically, it involves an imaging system which incorporates techniques first developed in the geophysical sciences for analyzing seismic traces to create high resolution medical images.

2. Description of the Related Art

Well known ultrasound imaging systems commonly provide medical images for a variety of uses. In general, ultrasound imaging utilizes a sound source to ensonify a target area and a detector to receive the echo. Ultrasound can often penetrate objects which are imperious to electromagnetic radiation. However, acoustical imaging systems have traditionally produced lower resolution images than electromagnetic radiation imaging systems.

The introduction of synthetic aperture focusing into medical imaging systems has helped to improve the quality of ultrasound images over previous systems which used direct focusing. The synthetic aperture focusing technique (SAFT) was originally used in radar systems to image large areas on the ground from an aircraft. In SAFT, the transmitted beam is a broad band signal which is sent out in a wide cone of transmission. The broadband nature of the transmitted signal allows direct measurement of the time of return or the phase information of the signal, thereby allowing the determination of the range of any reflectors (i.e., changes in acoustical impedance) which cause returning echoes. Moreover, the wide cone transmission beam in SAFT allows recording on one receiver channel of echoes returning from all directions. This provides information about an entire area, eliminating the need to scan the area point by point. However, since the direction from which the echoes have come cannot be determined from one receiver channel, SAFT requires the use of many receiver channels. By comparing information across all of the channels, the direction of the returning signal can be determined. This process enables focusing on a point by analyzing the receiver traces, and is thus referred to as synthetic focusing.

Another advantage of SAFT is that since it does not require beam steering, there is no need for expensive hardware to drive the array. Additionally, because the wavelength of the radiation used does not limit resolution, the resolution of the images produced can be increased by many orders of magnitude over that obtained with direct focusing. Examples of ultrasonic imaging systems that use SAFT are disclosed in U.S. Pat. Nos. 3,548,642, and 3,895,381.

U.S. Pat. No. 4,325,257, to Kino, et al. discloses a more recent acoustic imaging system that exemplifies typical SAFT processing. The Kino patent describes using an array of transducer elements in which each element is multiplexed in sequence to emit an ultrasonic pulse into the sample. Each transmitting element then acts as a receiver which measures and records the returning echoes. Once all of the transducer elements have obtained a time history trace of the echoes (i.e., a record of the return beam for a selected period of time), the traces are transformed into a three-dimensional image of the target using a conventional reconstruction algorithm. Each point of the three-dimensional image represents a point in the sample and contains a value which represents the strength of the reflected signal at that represented point location in the sample. Strong reflectors, such as bone, have high values at the surface. Values are close to zero at locations where there are no reflecting surfaces or objects. Once a three-dimensional image is obtained, it can be collapsed to generate any two-dimensional view of the sample using conventional tomography techniques. Typical systems display the collapsed two-dimensional view on a CRT monitor.

The reconstruction algorithm disclosed in the Kino patent is based on the travel time of the echo signals. In other words, for a reflecting object at a given location in a sample, the echo returning from that reflector appears at a different time in the time history trace of each receiver channel. The algorithm involves calculating, for a specified reflector location, the return time to each receiver from that specified reflector location, and then summing across the channels all of the echoes which came from that specified location in the sample. The summing reinforces any coherent information from a potential reflector at the specified location and cancels the noise from various other random locations in the sample, leaving only the signal information which originated from the specified location. If no reflector (i.e., no acoustical impedance change) is present at the specified location, no coherent information will exist and the signals tend to cancel each other when summed. Each point location in the three-dimensional map (also known as a focus map) of the sample is calculated using this procedure. This procedure is commonly termed "migration" in geophysics, and there is a great amount of literature published about it dating back to 1954, when J. L. Hagedoorn's thesis paper entitled "A Process of Seismic Reflection Interpretation," provided the graphical foundation on which migration procedures are based. This paper can be found in *Geophysical Prospecting*, Volume II, No. 2, June 1954.

U.S. Pat. Nos. 5,005,418, and 4,817,434, to Anderson both disclose medical ultrasound imaging systems that incorporate SAFT using a single transmitted pulse. The systems described use a transducer array having a center transmitter element and a set of surrounding receiver elements. Instead of multiplexing the receiver channels to record a set of return signals in sequence, the transmitter sends out a single pulse, and the receivers record the returning echoes simultaneously. From the recorded time-history traces, a focus map of the sample is obtained using a reconstruction algorithm. Pat. No. 4,817,434, discloses a summing algorithm similar in principle to the one described by Kino, except that all of the time history traces originate from the same transmitter. This is similar to algorithms that are used in seismic exploration which are known as migration algorithms. Pat. No. 5,005,418, discloses a reconstruction algorithm known as ellipsoidal backprojection, which differs from the procedure described in Pat. No. 4,817,434. However, the backprojection algorithm also relies on the time-of-travel principle.

Because the reconstruction methods described above rely on time-of-travel calculations, calculating the correct travel time between the array elements and the reflector locations in the sample for the purpose of reconstructing the three-dimensional map of the sample requires knowledge of the velocity of sound typically through the sample. A problem that arises with both ellipsoidal backprojection and migration, which both rely on time-of-travel calculations, is that the velocity of sound varies at different locations throughout the sample. Knowledge of these velocity variations provides information needed to correctly align the receiver traces for the summing process.

However, because the velocity variations are not known in advance, the reconstruction algorithms disclosed in the conventional systems rely on an assumption that the velocity of sound does not vary throughout the sample. This assumption seriously limits obtaining accurate information about reflector locations. The sound may also refract as it travels through the sample, thereby increasing the time-of-travel as well as changing the receiver location (from that expected) of the first return signal from a reflector in the sample.

In general, current techniques in medical imaging do not adequately account for either of these effects. These unaccounted for realities severely degrade the accuracy and quality of reconstructed images because the coherent reflector information from any selected channel will be skewed in time from coherent information from other channels. The skew in time is caused by the velocity variations within the sample. This results in a significant loss of information when the signals are summed together because coherent information which is skewed in time will be discarded as noise in the summing process, and noise signals may be summed as coherent information. Thus, a need exists for a more satisfactory reconstruction procedure which accounts for the changes in sound velocity throughout the sample.

The geophysical sciences utilize reconstruction methods in seismic imaging to accurately obtain velocity information. Determining the location of reflecting surfaces beneath the ground and identifying the various geological materials of which the strata is composed are both important in geology. A technique commonly called common depth point (CDP) stacking in seismic imaging determines the velocity of sound for different travel paths and different locations throughout the sample. The velocities provide accurate information for calculating the correct time-of-travel in the migration procedure. The velocities can also be compared with a database of velocities to identify the nature of materials at various locations. W. Harry Mayne introduced CDP stacking in 1962 in the field of seismography. (see *Geophysics,* Vol. 27, no. 6, p. 927). More recent uses of this method are disclosed in U.S. Pat. No. 4,992,996, to Wang, et al.

SUMMARY OF THE INVENTION

The present invention involves an ultrasound imaging system, particularly adapted for use in generating images of anatomical structures. The present invention utilizes a CDP analysis technique similar to that used in seismic imaging to obtain velocity functions for the sample (i.e., a map of the velocity functions in time for many points across the array, hereinafter referred to as a "velocity volume"). After the velocity functions are generated, a focus volume is obtained with a CDP stacking technique similar to that used in seismic imaging. Finally, a migration algorithm is performed which relies on the information from the velocity functions to make accurate time-of-travel calculations to locate the coherent echo signals originating from common locations. Through migration, an image field (i.e., a reconstructed focus volume) of the sample is generated which is more accurate and provides significantly higher resolution than obtained by prior art medical imaging systems. The images extracted from the image field in the present invention are of correspondingly higher quality.

The velocity volume itself may be used to identify various tissue materials within the body based on their characteristic velocity signatures. For instance, an image may be generated representing velocities throughout the sample. Because the velocities relate to the acoustical impedance of the points in the volume, this information itself may be useful. For instance, if human tissue is diseased, the diseased tissue often has an acoustical impedance which differs from the impedance of normal tissue. Accordingly, anomalies in the impedance may provide valuable diagnostic data.

One aspect of the present invention involves a method of imaging an organism comprising transmitting acoustic energy into a selected portion of the organism from a first plurality of locations, receiving reflections of the acoustic energy at a second plurality of locations, and reconstructing a mapping of the velocity of the acoustic energy in the selected portion with a common depth point velocity analysis of the reflections of the acoustic energy.

Another aspect of the present invention involves a method of imaging an organism. The method comprises a number of steps. A burst of acoustic energy is transmitted from a transmitter located proximal to the organism, the burst being of sufficient energy to propagate from the transmitter to a selected portion of the organism to be imaged and to reflect back to at least one receiver. The signals which reflect back are sampled to obtain a set of time history recordings of the signals reflected from the selected portion, each of the time history recordings being taken at a different receiver location. The transmission and reception are repeated for a plurality of different transmitter locations to obtain a set of time history recordings associated with each of the plurality of transmitter locations. A set of time history recordings is then selected, and each of the time history recordings in the selected set is associated with a different pair of receivers and transmitters, wherein the receiver and transmitter pairs are disposed substantially symmetrically about a common surface point. The selection then repeats for a plurality of common surface points to obtain a plurality of selected time history recording sets. A set of velocity functions are then assembled associated with the common surface points. The set of velocity functions are obtained from the plurality of selected time history recording sets. The velocity functions are organized to represent a three-dimensional field indicative of the actual velocity of the acoustic energy within the selected portion of the organism. A three-dimensional field representing the reflectors in the sample is generated. This three-dimensional representation can be displayed on a three-dimensional display. Finally, a two-dimensional image is generated and displayed utilizing the three-dimensional representation of the reflectors.

In one embodiment of this method, the acoustic burst is a swept frequency signal varying in frequency between a first frequency and a second frequency. Further, the first frequency and the second frequency are within the range of 1 to 8 Megahertz in one embodiment. Advantageously, the first frequency and the second frequency are related by a ratio of 2 to 1 or higher, with improved resolution obtained with ratios of 2.5 to 1 and higher. Advantageously, the duration of the sweep is sufficient at the instantaneous transmission power to inject sufficient acoustic energy during the sweep to penetrate to the desired depth in the sample and to generate return reflections having an adequate signal-to-noise ratio, as further explained herein. The total effective power injected into the sample is advantageously adjustable from sample to sample to obtain the desired image.

In one embodiment, this method may desirably be used where the selected portion comprises human tissue, bone, and organs within a human body, or tissue having diseased tissue.

Another aspect of the present involves a method of mapping inhomogeneities in tissue. According to this aspect, acoustic energy is transmitted into the tissue from a plurality of transmitter locations, reflections of the acoustic energy are received at a plurality of locations, and a wavefield representation is reconstructed with a common depth point velocity analysis of the reflections of the acoustic energy in order to generate three-dimensional mappings of the inhomogeneities in tissue.

Still another aspect of the invention involves a method of diagnosing anomalies in human tissue. This method comprises transmitting acoustic energy into human tissue from a plurality of locations, receiving reflections of the acoustic energy at a plurality of locations, reconstructing a three-dimensional mapping of the velocity of sound in the tissue with a common depth point velocity analysis of the reflections of the acoustic energy, and comparing the velocity in the tissue with the velocity of known anomalies in human tissue.

Still another aspect of the present invention involves a signal receiving system for use in an acoustical imaging system, wherein the imaging system utilizes an array having multiple transducers. The signal receiving system has an array having a plurality of transducer elements capable of functioning as receivers, and a set of receiver channels which number fewer than the number of receivers in the array. Each receiver channel in the set is assigned to a selected portion of the plurality of transducers in the array such that for any predetermined set of transducers symmetrically located about a selected transducer, wherein the predetermined sampling set of transducers equals the number of channels in the set of receiver channels, each receiver channel in the set is only assigned to one transducer in the predetermined sampling set. A switching unit selectively connects the transducers to the assigned receiver channels for any predetermined sampling set. In one embodiment, the array is conformable to the sample surface. In another embodiment, the array is substantially planar.

Yet another aspect of the present invention involves a method of switching signals from a selected sampling set of transducers in an acoustical imaging system, wherein the transducers form an array, to a set of receiver channels which are equal in number to the number of transducers in the selected sampling set of transducers. This method involves a number of steps. Each of the transducers in the array are assigned to a respective receiver channel in the set of receiver channels. For any predetermined sampling set of transducers symmetrically located about a selected transducer anywhere within the array, each receiver channel in the set of receivers is assigned to no more than one transducer in the predetermined sampling set. A first predetermined sampling set of transducers is selected equal in number to the number of receivers in the set of receiver channels. The first predetermined sampling set is symmetric about a selected transducer. The first predetermined sampling set of transducers is then electrically connected to the set of receiver channels with a switching circuit, and a second predetermined sampling set of transducers equal in number to the number of receivers in the set of receiver channels is selected, wherein the second predetermined sampling set of transducers comprises a portion of the same transducers in the first predetermined sampling set. The first predetermined sampling set of transducers is electrically disconnected from the set of receiver channels with the switching circuit. Finally, the second predetermined sampling set of transducers is electrically connected to the set of receiver channels with the switching circuit.

BRIEF DESCRIPTION OF THE DRAWINGS

FIG. 4 is a symbolic representation of the sensor array illustrating the connections between the receiver channels and the array elements.

FIG. 5 is a symbolic representation of the sensor array illustrating the transducers chosen for collecting data for a radial CDP gather on a common depth point.

DETAILED DESCRIPTION OF THE PREFERRED EMBODIMENT

Figure 1:
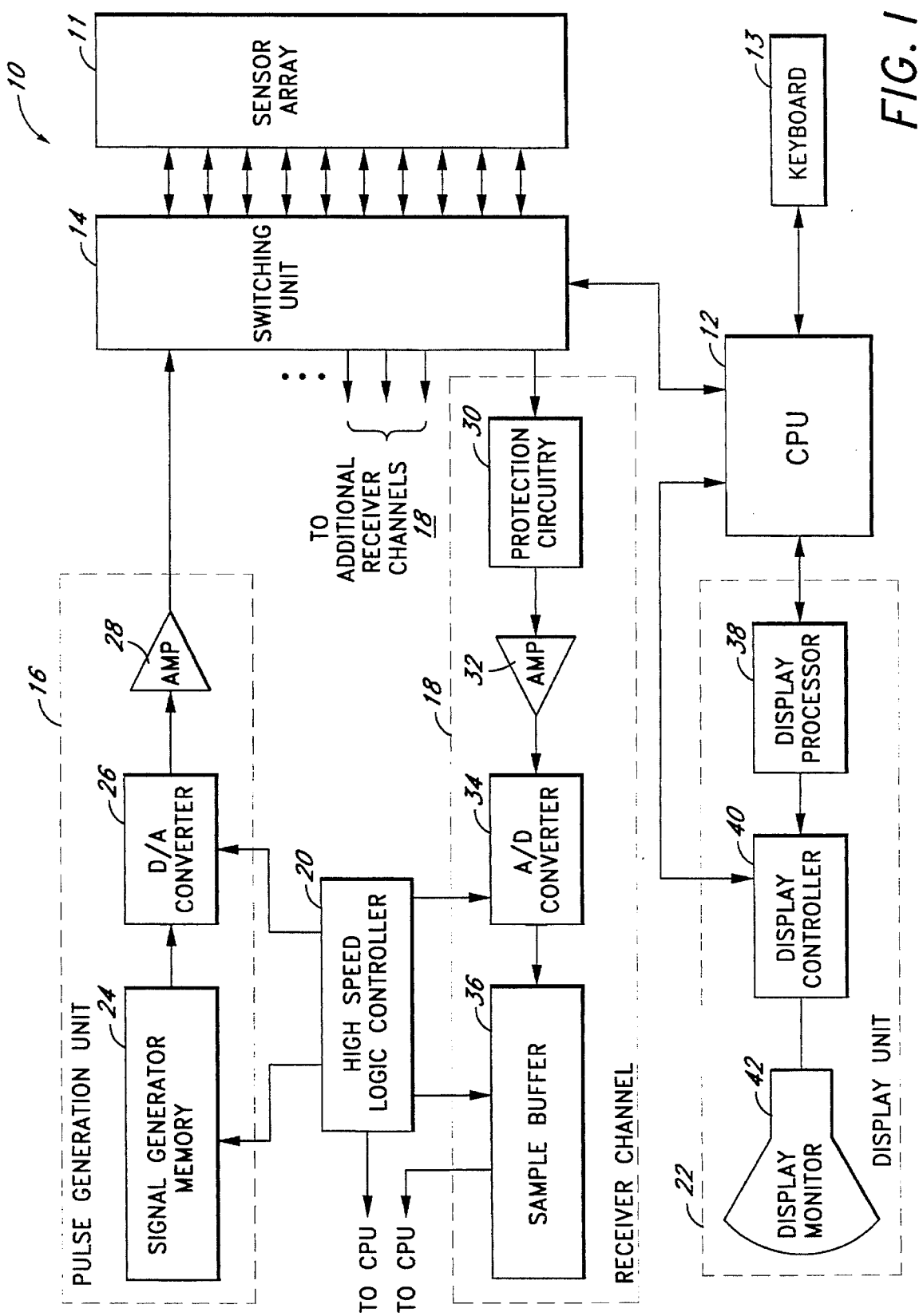
FIG. 1 is a generalized block diagram illustrating electronic components of the synthetic aperture imaging system according to one embodiment of the present invention.

FIG. 1 depicts a block diagram of the imaging system 10 according to one embodiment of the present invention. The imaging system 10 comprises a sensor array 11, a CPU 12, a keyboard 13, a switching unit 14, a pulse generation unit 16, a set of receiver channels 18, a high speed logic controller 20, and a display unit 22.

In the embodiment of FIG. 1, the pulse generation unit 16 comprises a signal generator memory 24, a digital-to-analog (D/A) converter 26, and a transmitter amplifier 28. Each receiver channel 18 has a protection circuit 30, a receiver amplifier 32, an analog-to-digital (A/D) converter 34, and a sample buffer 36. The display unit 22 comprises a display processor 38, a display controller 40, and a display monitor 42.

In one embodiment, the sensor array 11 comprises a set of transducer elements arranged in a substantially planar two-dimensional grid. Two-dimensional arrays are known in the art. For instance, Forrest Anderson discloses a two-dimensional array in his patents (e.g., U.S. Pat. No. 4,817,434). Linear arrays are also known in the art as disclosed in Pat. No. 4,127,034, to Lederman, et al. The array 11 may also be somewhat conformable to the sample surface. If the array 11 is conformable, the return data can be compensated to be in reference to a plane by sensing the curvature or deformation of the array from a selected reference plane.

The array elements may be made of a suitable piezoelectric material as used in the art. One class of materials which can be used are copolymers which are derived from polyvinylidene fluoride (PVDF). Some of these are disclosed in Pat. No. 4,917,097, to Proudian et al. Another common material used in ultrasound sensor arrays is PZT ceramics. Use of such a material is described in detail in Pat. No. 4,325,257, to Kino. Advantageously, each element is capable of either converting an electrical signal into an equivalent acoustical signal for transmission or converting a received acoustical signal into an electrical signal.

Therefore, in one embodiment, each element is symmetrically positioned in the array and may both transmit and receive sound waves to and from a sample, respectively. Using transducers that perform both functions during operation provides high resolution. However, arrays with distinct transmitters and receivers are well known in the art. Thus, in another embodiment, the algorithms may compensate for irregular spacing between the transducers, and for interlacing transmitters and receivers symmetrically or asymmetrically. In yet another embodiment, the transducers are capable of transmitting or receiving, but a transducer acting as a transmitter at any given instance is not used to receive its own signal. Common algorithms are well known in the field of geophysical imaging which account for these different array configurations.

Each of the elements in the sensor array is connected to the switching unit 14 by a separate electrical connection. The pulse generation unit 16 and the receiver channels 18 are also connected to the switching unit 14. Under control of the CPU 12, the switching unit 14 demultiplexes signals output from the pulse unit 16 to any of the elements in the sensor array 11. In one embodiment, the switching unit 14 also multiplexes received signals from the elements in the array to any of the receiver channels 18. In another embodiment which requires fewer receiver channels, the receivers in the array are each assigned to a particular receiver channel 18. By assigning the receivers to particular receiver channels 18, the switching unit 14 need not be as complex, and fewer receiver channels 18 can provide the necessary receiving capabilities. FIG. 4 depicts an example of this configuration and illustrates the receiver channel assignments in an exemplary 10 by 10 array; each block represents an element in the array. The subscript numerals indicate to which receiver channel the corresponding receiver element is assigned (i.e., the 'x' in $R_x$ indicates the receiver channel assigned to the marked element). In this embodiment, the switching unit 14 multiplexes signals received from the set of elements active in the array during sampling to the assigned receivers. The switching sequence is controlled by the CPU 12. This configuration is explained in more detail below.

The signal generator memory 24 may comprise a random access memory and contains a sequence of values which represent the shape of the signal to be transmitted into the sample. Advantageously, the values in the signal generator memory 24 when sequenced through the D/A converter 26 result in a swept frequency signal ("chirp signal") which has a center frequency in the megahertz range (e.g., 1 to 8 megahertz is advantageous). Advantageously, the ratio between the upper and lower frequencies in the sweep is at least 2 to 1, with improved resolution from ratios of 2.5 to 1 and higher (e.g., a sweep from 2 to 5, or 3 to 7.5 megahertz). Under the control of the CPU 12, the high speed logic controller 20 sequences the output of the signal generator memory 24 such that a digital representation of the chirp signal is sent to the D/A converter 26. The D/A converter 26 converts the digital signal to an analog signal and smoothes the signal with a low pass filter (not shown). The transmitter amplifier 28 amplifies the smoothed signal from the D/A converter 26. The signal output from the amplifier 28 is then routed through the switching unit 14 to an appropriate transducer element in the array 11 which is selected as a transmitter as further explained herein.

Advantageously, the duration of the sweep is sufficient at the instantaneous transmission power to inject sufficient acoustic energy during the sweep to penetrate to the desired depth in the sample and to generate return reflections having an adequate signal-to-noise ratio, as further explained herein. Increasing the sweep duration at a selected transmission power increases the acoustic energy transmitted into the sample. The total effective power injected into the sample is advantageously adjustable from sample to sample to obtain the desired image. It should be noted that transmission power maximums are regulated for acoustic imaging in humans. The instantaneous transmission power does not exceed the regulated levels. Therefore, to increase the total acoustic energy, the sweep duration is increased. Alternatively, the reflections from multiple sweeps can be summed, as well known in seismic imaging.

In the present embodiment, each receiver channel 18 is capable (via the switching unit 14) of receiving the return signal from a subset of transducer elements in the sensor array 11. In an embodiment where elements in the array both transmit and receive signals, the transducers in the sensor array 11 can be connected via the switching unit 14 to the signal generation unit 16 and to the input of the receiver channels 18. Therefore, direct electrical connection between the output of the signal generation unit 16 and the input to a receiver channel 18 can exist through the switching unit 14 for an element selected to transmit. Upon transmission of a signal by an element in the sensor array 11, the transmitted signal transfers directly to the associated receiver channel 18 for the same element. The transmitter signal is typically too intense for the receiver amplifier 32 to withstand. Therefore, the protection circuit 30 is connected between the array elements and the amplifier 32 in each receiver channel 18 to filter the raw transmission signals which would otherwise pass directly to the receiver amplifiers 32. The protection circuit 30 suppresses signals with a voltage which is above a value which may damage the receiver amplifier 32.

The receiver amplifiers 32 amplify signals received on the associated receiver channel 18. The resultant signals pass to the A/D converters 34 where they are sampled. In one embodiment, the sample rate is selected as at least twice the upper frequency of the swept frequency signal (i.e., commonly known as the Nyquist rate). The resulting digitally sampled signal is stored in the sample data buffers 36.

Advantageously, the sample buffers 36 comprise high speed random access memories (RAM) where data can be stored sequentially at the sample rate. In the present embodiment, the logic controller 20 manages the sample buffers 36 and the sampling by the A/D converters 34. With every sample, the high speed controller 20 increments an address counter (not shown) which directly addresses the sample buffers 36. Accordingly, during sampling, the data is loaded into the data buffers 36 sequentially at the sample rate. An appropriate size of the sample buffer 36 in the present embodiment is between 2–8 kilobytes. However, the amount of storage needed for the sample buffer 36 depends upon the desired sample thickness and the sampling frequency, as further explained herein.

The high speed logic controller 20 interfaces with the CPU 12, which also has memory storage (not shown). In the present embodiment, after a selected number of samples are stored in the sample data buffers 36, the contents of the sample buffer 36 for each receiver channel 18 are transferred to the CPU memory or other system memory, as further explained in the discussion of the system operation below. The transfer of information between the sample buffer 36 for each receiver channel 18 in the system and the CPU memory takes place at a frequency dictated by the slowest of the CPU memory system or the sample buffer 36.

Once sufficient data is obtained to be useful, the data can be processed and displayed in a variety of ways as further explained herein. One implementation of a display unit 22 is depicted in FIG. 1. In the present embodiment, the display unit 22 displays images on the monitor 42. In the display unit 22 depicted in FIG. 1, the data may be manipulated by a display processor 38 to generate displayable information through conventional methods such as thresholding (i.e., assigning a different color based upon various threshold levels deemed of significance within the data) or grey-scaling, as is well known in a variety of imaging contexts. In the display unit 22, once the data is manipulated to provide useful display information, the data can be transferred to the display controller 40 which outputs the image on the display monitor 42. In one embodiment, the display monitor 42 is a conventional display such as a CRT display. In an alternative embodiment, the display monitor 42 is a three-dimensional display.

In an alternative embodiment, the display unit 22 may omit the display processor 38. The display processor 38 is simply a specialized processor dedicated to performing calculations to generate information which is useful for display. For instance, the display processor 38 may perform the thresholding or grey-scaling and utilize a three-dimensional representation of the measured characteristics of the sample to be imaged to obtain a two-dimensional slice within the three-dimensional representation. The display processor may also adjust the viewing angle from which to view the sample as selected by a user or as incorporated in the system software. If the display processor 38 is omitted, these functions may be executed by the CPU 12.

Additionally, the display processor 38 may share control over these various data manipulations for display purposes with the CPU 12. Display units similar to that depicted in FIG. 1 are well known in the art.

System Operation

Figures 2, 3A, 3B:
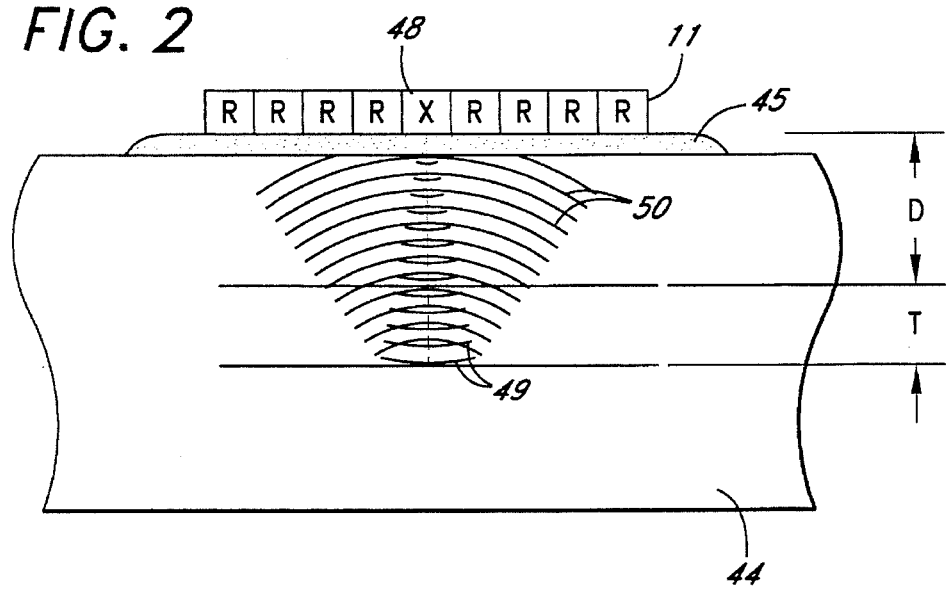
FIG. 2 is an exemplary view of a sensor array positioned above a sample to be imaged.
FIG. 3a and FIG. 3b are symbolic representations of the sensor array and illustrate an example of different sets of array elements used in obtaining data.

Given the description of the basic system hardware, the system operation is now disclosed for obtaining various useful images of selected tissue in an organism. For discussion purposes, a method utilizing the system to image human tissue (e.g., bone, organs, anomalies in the human, etc.) is disclosed. To obtain an image of selected tissue, the transmitter/sensor array 11 is placed on the surface of the skin proximal to the location of the internal tissue to be imaged. FIG. 2 depicts a side view of the transducer array 11 positioned over a portion of an organism 44 such as a human body. It depicts a transmitter 48 labelled 'X' and a number of receivers labelled 'R' surrounding the transmitter. FIG. 2 also depicts an example of the trajectory of a transmitted acoustic signal 49 (i.e., the acoustic wavefront) and some return signals 50 within the sample 44. The sample range (i.e., the desired depth into the sample) is labelled 'D' and the desired thickness to be examined within the sample is labelled 'T.' In other words, during sampling, the portion of the sample of interest is that portion labelled 'T.' The signals returning from the portion of the sample labelled 'D' are preferably ignored. It should be noted that the portions of the sample labelled T and D are merely exemplary and that all or any portion of the sample could be imaged depending on the values selected for D and T.

An intervening medium 45 which closely matches the acoustic impedance of the human body (or which matches the impedance of other tissue to be imaged) is used in order to acoustically couple the transducer elements to the sample. The acoustical impedance of the human body is close to that of water. Therefore, an appropriate intervening medium 45 may be water, or a substance with an acoustical impedance which is close to water such as hema. Preferably, an air-free seal is created between the surface of the skin, the array 11, and the intervening medium 45. Alternatively, a vacuum seal is created. This intervening medium 45 which provides a coupling interface between the array 11 prevents the sound waves from scattering. If the area of skin is sensitive, as with burn patients, PVA-gel can be used as the intervening medium 45 because this gel provides a good seal and also closely matches the acoustic impedance of the human body.

Figures 10, 11:
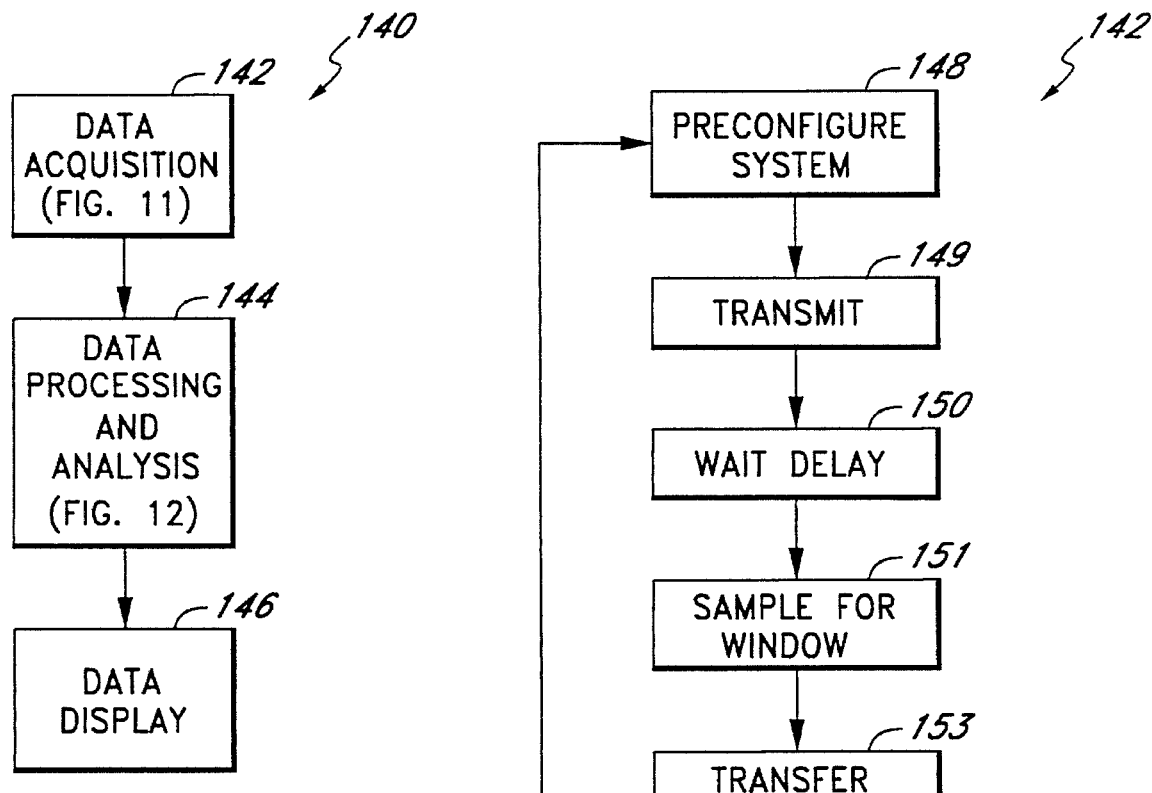
FIG. 10, FIG. 11, and FIG. 12 are flowcharts representing the processing of the data according to one embodiment of the present invention.
Figure 12:
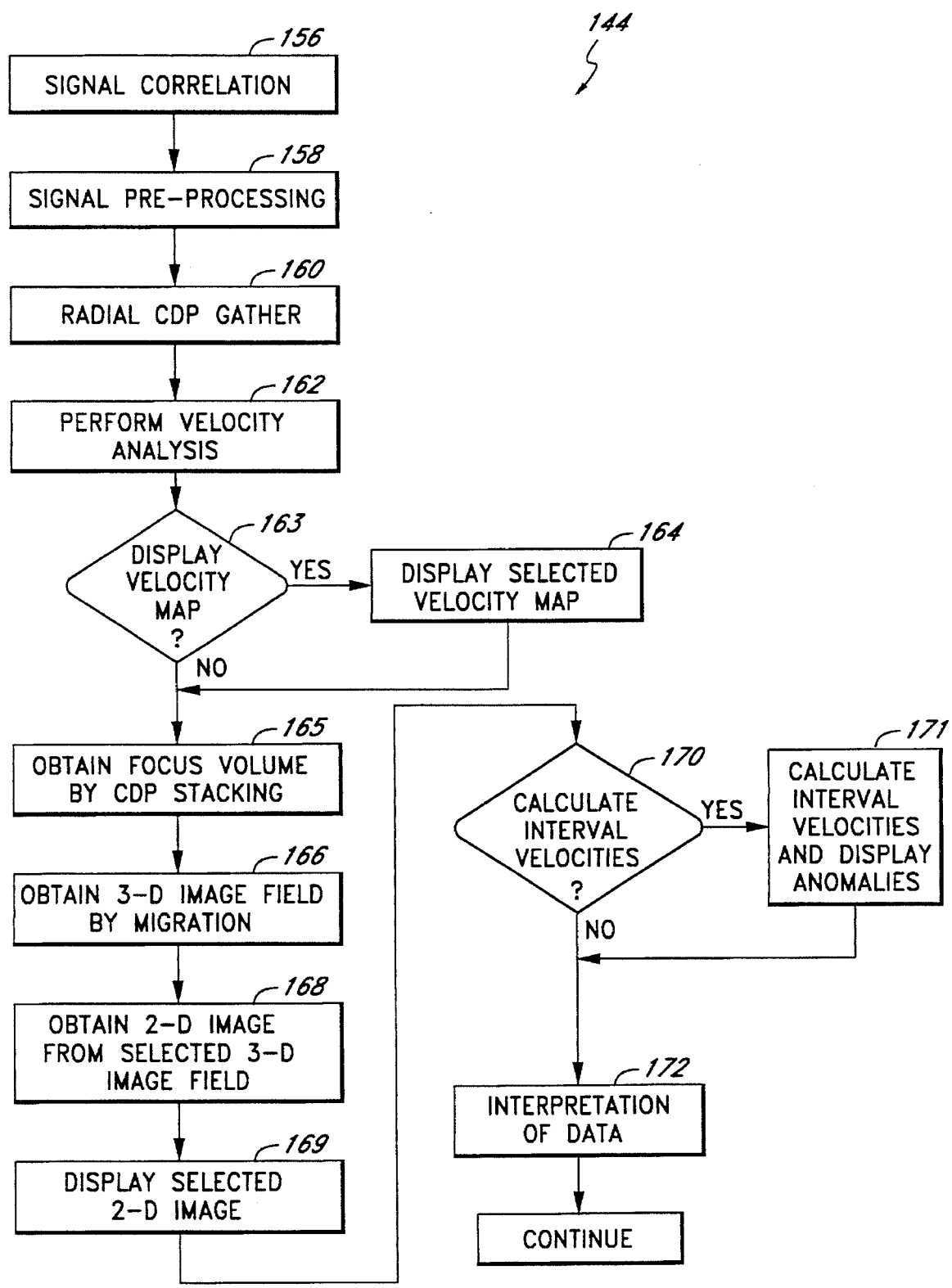

FIGS. 10–12 depict the general flow diagrams according to one embodiment of the present invention. The discussion relating to the system operation continues with reference to these flow diagrams. Once the sensor array 11 is positioned properly, the imaging system 10 begins data acquisition as represented in an action block 142 of a flow diagram 140 shown in FIG. 10. In general, the data acquisition involves transmitting an acoustical signal (e.g., the swept frequency chirp) and detecting the returning echoes. This process is generally referred to as a recording.

The process of data acquisition is depicted in more detail in the flowchart of FIG. 11. As depicted, before a recording is taken, the CPU 12 under software control preconfigures the system 10, as represented in an action block 148 (FIG. 11). During preconfiguration, the CPU 12 provides the parameters to the logic controller 20 regarding the time delay from the sending of the chirp signal to the point in time at which the sampling of the echoes should begin and at which the sampling should cease. The time period from beginning of sampling by the receiver channels 18 to the end of the sampling is hereinafter referred to as the "sampling window" for the recording.

The time delay from the transmission of the signal from a single transmitter to the beginning of sampling (hereinafter the "depth delay") determines the starting range (the depth into the sample from the transducer array) at which the sample is being imaged. For a desired starting range D (FIG. 2) into the sample at which sampling is desired, the general formula for the depth delay time to begin recording is (depth delay)= 2 D/V, where V is the average velocity of sound in the sample.

Similarly, the duration of the sample window for a given thickness T which is to be imaged from the desired starting range is 2 T/V. However, it should be understood the sample window duration equation is an approximation which assumes that the signal travels perpendicular to the array and returns to the same location. As depicted in FIG. 2, some of the transmitted signal 49 returns along a path other than the path of transmission (e.g., the signals 50) and is received at receiver locations spaced a distance from the transmitter 48. The transmitted signal 49 also often refracts as it traverses through the sample rather than travelling straight. Accordingly, if an image of a particular thickness T is desired, the sampling window should be slightly longer than 2 T/V to allow the signals from reflectors within the sample thickness T to return to receivers a distance from the transmitter 49.

The size of the sample buffer 36 needed to store samples for a given thickness T is given by the following equation:

(buffer size)= (sample window)×(sample rate)

where:

sample window= 2 T/V

T is measured in mm,

V is measure in mm/sec, sample rate is measured in samples/sec (Hertz), and buffer size is measured in the number of samples.

As explained above with respect to the sampling window, the buffer size should be slightly larger than indicated by the equation to allow for the return signals to reach the receivers a distance from the transmitter. The increase needed is dependent upon the spacing of the receiver in the set of active receivers that is the furthest from the active transmitter during the particular recording.

In the present embodiment, one byte is used for each sample from the A/D converters 34 using 8-bit A/D converters, as is well known in the art. Higher or lower resolution A/D converters could also be used depending upon the system configuration and characteristics. Using the 8-bit A/D converter, the buffer size equals the number of bytes of memory required.

The logic controller 20 uses the depth delay information it receives from the CPU 12 during preconfiguration to activate the A/D converters 34 and the sample buffers 36 at the appropriate time to start sampling at the desired depth D (FIG. 2). The logic controller 20 uses the sampling window to continue sampling the signals from the array 11 for the desired thickness T.

Preconfiguring the system also involves selecting, through the switching unit 14, the particular transducer to function as a transmitter and the set of corresponding transducers to function as receivers for the particular recording. In other words, the switching unit 14, under the CPU's control, multiplexes the output of the pulse generation unit 16 to the transducer selected as the transmitter. Likewise, the switching unit 14 connects the transducers selected as receivers to the associated receiver channels 18. Accordingly, for each recording, a set of the transducer elements in the sensor array is selected for propagation of the received signals to the receiver channels 18. FIG. 3a depicts a symbolic representation of a 10 by 10 element sensor array 11. FIG. 3a does not represent the appearance of the physical array, but illustrates one embodiment of the positioning of the array elements. Each square represents one element for a total of 100 elements, each of which can advantageously transmit or receive signals. This representation is simplified for discussion purposes. One embodiment of the present invention uses a larger array which comprises, for instance, 1,024 elements arranged in a 32 by 32 square. However, the 10 by 10 array exemplifies the configuration which could be used in a 32 by 32 array. In one embodiment, the transducers in the array are spaced on the order of centimeters. The spacing depends upon the depth at which imaging is desired and the number of receivers used for sampling around any transmitter. However, the system is very flexible with respect to the spacing of the transducers depending upon the desired sample depth.

Advantageously, the receiver channels 18 selected for a particular recording simultaneously sample the return signals from the respective receivers for a single transmission. In this manner, the receiver channels selected for a single recording receive return signals from the same transmission pulse. However, data acquisition for a recording need not be simultaneous from all the receivers selected for a recording. A single transmission element could be fired multiple times in order to obtain data from one or more receivers per firing until all receivers selected for a single recording have been sampled. In other words, the same transmitter could be fired multiple times, one firing for each of the receivers in the set selected as active for the recording.

If all selected receivers for a recording do not sample in parallel, the array should remain motionless with respect to the subject, and the transmission coupling between the subject and the array should remain stable. Alternatively, the system could sample from two receivers in parallel for each firing from the same transmitter, collecting calibration data from the same receiver for each transmission and collecting raw data from different receivers for each transmission. In this manner, the calibration data for each firing for a single recording is compared to compensate for any motion between the array, the coupling and the subject between firings. Any change between firings from the same transmitter results in a change in the calibration reading for each transmission. By using this calibration data, the corresponding raw sample values from a receiver can be adjusted in relationship to the sample values from the other receivers selected for the recording in order to compensate for changes between firings of a transmitter.

FIG. 3a also illustrates one possible set of elements (labelled "$A_x$") selected from the 10 by 10 array for a single recording which is hereinafter referred to as "recording A." In this example, for recording A, element $A_{13}$ 52 is the transducer selected to operate as a transmitter and elements $A_1$–$A_{25}$ are selected as receivers. Advantageously, transducer element $A_{13}$ 52 functions as both a transmitter and a receiver for recording A. However, as previously discussed, other configurations where $A_{13}$ 52 does not function as both a transmitter and a receiver for the same recording are also possible. During preconfiguration, the CPU 12 selects routing of the chirp signal generated by the pulse generation unit 16 through the switching unit 14 to the transducer element $A_{13}$ 52, and routes the signals from transducer elements $A_1$–$A_{25}$ through the switching unit 14 to 25 of the receiver channels 18. With this configuration of the switching unit 14 for recording A, a chirp signal generated by the generation unit 16 is transmitted from the element $A_{13}$ 52 outlined in bold in the diagram. The return signals are recorded by the twenty-five selected receiver channels which are connected during preconfiguration to the elements denoted $A_1$–$A_{25}$ in a 5 by 5 square of elements around the transmitter element $A_{13}$ 52. However, the arrangement of the selected receiver elements for a given recording is not limited to a square. A substantially circular arrangement is often desirable because the cone of transmission of a broad-beam acoustic signal is likely to be substantially circular.

The entire array of receivers is not generally used for each recording because the most acceptable reflection signals return to receivers located closest to the transmitter. Selecting the receivers from which to obtain samples of the return echo signals involves a number of considerations such as the signal-to-noise ratio and the angle between the incident and reflected signals with respect to the reflectors in the sample.

With respect to the signal-to-noise ratio, at some distance from the transmitter, the signal-to-noise ratio is too small to obtain useful information from the return signal. For instance, assuming that two channels have coherent signals $S_1$ and $S_2$, they can be summed in phase to produce a signal $S_1 + S_2$ which has the same shape as the original signals. Both signals, however, have incoherent noise levels $N_1$ and $N_2$ respectively. Assuming that the noise signals are not correlated, they tend to add orthogonally, so that the resulting noise level of the summed signal is $(N_1^2+N_2^2)^{1/2}$. Thus the signal-to-noise ratio of the two channels before summing are $S_1/N_1$ and $S_2/N_2$ and the signal-to-noise ratio after summing is $(S+S_2)/(N_1^2+N_2^2)^{1/2}$. As channels are summed together, the total signal-to-noise ratio becomes the sum of the signals divided by the square root of the sum of the squares of the noise levels over all channels, assuming the desired signals are coherent. Channels with low signal-to-noise ratios tend to lower the overall signal-to-noise ratio of the summed signal, and should therefore not be used in the sum. Since the receiver channels around the transmitter generally have the highest signal-to-noise ratios, these are chosen for summing.

The maximum distance from the transmitter for an acceptable signal-to-noise ratio increases with the power output of the transmitter and decreases with the attenuation constant of the medium through which the signal travels. The signal-to-noise ratios also decrease with the distance that the signal has travelled through the medium. Accordingly, the signal-to-noise ratio decreases at a single receiver as time progresses.

The selection of receivers also depends upon the angle between the incident signal upon a reflector and the reflected signal from the same reflector in the sample. The intensity of the transmitted beam decreases with the increasing angle from the normal to the sensor array 11. Moreover, the reflection coefficient changes and mode conversions begin if the angle is too great. Generally, the angle between the incident signal and the reflected signal should be small enough to prevent significant changes to the reflection coefficient and to minimize any mode conversion in the signal, as well known in the geophysical sciences. The angle should also be small enough so it does not affect the strength of the signal significantly. A common guideline is for the angle between an incident broad-beam signal and the reflected signal from a single reflector not to exceed 30°–45°.

Because of the number of factors affecting the signal-to-noise ratio and the selection of the receivers in general, determining which receiver channels are "good" channels is best done experimentally using reflectors at known locations. The signals can then be measured directly and a suitable set of receivers can be determined using the factors described above.

FIG. 3b illustrates the element configuration for a separate recording, hereinafter referred to as recording B. The selection of elements for recording B as shown in FIG. 3b is similar to the configuration for recording A (i.e., a 5 by 5 square). However, the elements selected, labeled $B_1$–$B_{25}$ are from positions in the array one element to the right of the elements denoted in FIG. 3a as elements $A_1$–$A_{25}$. As with recording A, one element is designated as a transmitter for the recording. For recording B, element $B_{13}$ 53 is designated as the transmitter.

Because not all of the receivers in the array are used at the same time, it is not necessary to have a separate receiver channel 18 for each element in the array. A system having a receiver channel for each receiver in the array would simply require more hardware. For a system which does not have a receiver channel for each receiver in the array, and which samples the receivers selected for a given recording simultaneously, the number of channels needed is the maximum number of receiver channels which are used in any single recording. For the array shown in FIGS. 3a and 3b, only twenty-five receiver channels are needed. For each recording, the receivers are selected by the switching unit 14 under the CPU's control as previously explained.

In the present embodiment, each receiver channel 18 is assigned to a set of elements in the array. The switching unit 14 then routes the receivers selected for a recording to the appropriate assigned receiver channels. In this manner, for every possible recording, only one of the elements assigned to each receiver channel is being used.

FIG. 4 represents one embodiment of the element/receiver-channel configuration according to this switching scheme for an imaging system with twenty-five receivers selected per recording. The elements are labelled with the symbols $R_1$ through $R_{25}$. The subscript numerals indicate to which of the twenty-five receiver channels 18 the respective receiver elements are assigned. For this example, there are four array elements assigned to each receiver channel because there are twenty-five receiver channels to service 100 elements. For example, the four elements assigned to receiver channel $R_{12}$ are shaded in FIG. 4. With this assignment of receiver channels, for any 5 by 5 square matrix of elements, all twenty-five receiver channels are used, although the receiver channel assignments correspond to different positions in the 5 by 5 matrix. Furthermore, for any 5 by 5 square matrix of elements selected in the array depicted in FIG. 4, no receiver channel 18 will have more than one assigned receiver in that 5 by 5 matrix.

A typical 5 by 5 matrix for a recording is outlined in bold in FIG. 4. In the embodiment depicted in FIG. 4, since only four elements are assigned to each receiver channel, the switching unit 14 requires only a 4 to 1 multiplexer for each receiver channel 18. This switching scheme reduces hardware costs over a more conventional methods such as multiplexing each receiver channel to every element in the array. The reduced channel switching scheme may also be generalized to an array with any number of elements and a system with any number of receiver channels, as long as the number of elements selected for any recording does not exceed the number of receiver channels in the system.

Once preconfiguration (action block 148, FIG. 11) for a recording, such as recording A, is complete, the CPU 12 sends a message to the logic controller 20 to begin the recording. The high speed logic controller 20 sequences the signal generator memory 24 to generate the swept frequency signal at the output of the signal generation unit 16. The selected transmitter sends the chirp signal, as represented in an action block 149 (FIG. 11). Next, the system waits for the depth delay period before beginning sampling, as represented in an action block 150. The system then begins sampling, and continues for the duration of the sample window, as represented in an action block 151. During the sampling, the receiver channels 18 under the control of the high speed controller 20 continually sample the signals from the receiver elements which have been selected during preconfiguration of the system. As previously explained, this involves sequentially storing the samples from each A/D converter 34 into the respective sample buffers 36 for the duration of the sample window. The receiver channels 18 execute this operation under control of the high speed logic controller 20. The high speed logic controller 20 signals the A/D converter 34 to sample the amplifier 32 output signal at the sampling rate and also controls incrementing of the address counter and the write signals for the sample buffers 36 in order to store the digital value from the A/D converter 34 in the sample buffers 36, as previously explained.

Once the samples are complete, the high speed logic controller 20 disables sampling for the recording. After a recording is taken, the recorded data is located in the sample buffers 36 of each of the receiver channels 18 which were selected for the recording. The data from the sample buffers 36 is then transferred to additional memory, for instance, the CPU memory, and maintained for further processing. This is represented in an action block 153 (FIG. 11).

After a recording is completed, the CPU 12 reconfigures the switching unit 14 for the next recording (i.e., the CPU 12 sets the active transducer elements and then proceeds with the next recording, and so on). Ideally, a recording should be taken for every potential transmitter element in the array. However, even a recording for one transmitter provides some information. Therefore, the number of recordings may be reduced in order to increase processing speed. If recordings are not taken for all potential transmitters in the array, the recordings taken are preferably spread across the entire array. The reason for this will be apparent upon the further explanation below.

Before an image for the sample is constructed, a series of recordings is generally taken in which each recording originates from a different transmitter and a different set of receivers surrounding the selected transmitter. Advantageously, each of the recordings is stored separately, at least temporarily, in system memory. However, mass storage devices (e.g., hard disk drives) may also be used at the expense of processing speed. Each recording comprises a set of time history traces of the returning echo signals, one trace for each receiver, and each recording corresponds to a different transmitter element. The relative position of each receiver with respect to the source element is maintained with each recording.

Once some (as few as two) recordings have been taken, as represented by a decision block 154 in FIG. 11, data processing and analysis can begin, as represented in an action block 144 (FIG. 10). In one embodiment, all the recordings from the array 11 could be taken before processing. However, once more than one recording has been taken and transferred to system memory, further data processing can begin. The steps involved in data processing and analysis are further represented in the flow diagram of FIG. 12. First, a number of preprocessing steps are performed on the recordings. The first step is signal correlation (represented by an action block 156), a process well known in the art (also often referred to as deconvolution). As is apparent, each recording contains a number of time history receiver traces representative of the echoes received during the sampling window by the corresponding receivers. Each of the receiver traces in each recording is correlated with the original chirp signal that was transmitted. Since the autocorrelation function of a chirp signal is a narrow pulse, the correlation process collapses the chirp echoes into pulses, making the return time of the echoes easy to determine. The actual return time of a reflection can be located by finding a peak in the results of the correlation function; however, the summing algorithm, as explained further herein, eliminates the need to explicitly search for these peaks.

After the correlation is performed on the traces, a number of other pre-processing steps may also be performed to remove effects which are associated with the sensor array. For example, the frequency response of the transmitter and receiver transducer elements, which may distort the chirp signal, may be deconvolved from the signal. This deconvolution is a conventional filtering process which is known in the art. Both the transmitters and receivers will also have variations in their responses which depend on the angle at which the acoustical signal was transmitted or received. These variations may be accounted for by varying the gain of each receiver amplifier in accordance with the computed angle between the reflected signal and the transmitted signal. In the present embodiment, this is done by the software program by multiplying the return signals by appropriate scaling factors. Corrections can also be made to compensate for the attenuation arising from the amount of time that the signal travelled through the sample. This would be done by multiplying the return signals by a scaling factor which increases as the time of return of the echoes increases. The outcome of the pre-processing is that the return data represents a substantially zero-phase, symmetric signal response to the sample. These pre-processing operations are represented in an action block 158.

After pre-processing a velocity volume is generated in memory. The velocity volume comprises a set of velocity functions in time for each surface point on the sensor array. In geophysical applications, a surface point is commonly referred to as a common depth point CDP, and is hereinafter referred to as a surface CDP. These surface CDPs are also known as common ground points or CGPs. FIG. 5 shows a representation of the array with a selected surface CDP 58 marked by an 'x'.

The first step in obtaining a velocity volume is to perform a radial common depth point (CDP) gather for each surface CDP, as represented in an action block 160 (FIG. 12). To perform the CDP gather, the surface CDPs undergo the following analysis. From each recording, receiver traces are chosen which originate from receivers which are symmetrically located across selected surface CDPs from the transmitter element for that recording. For instance, FIG. 5 depicts the selected surface CDP 58. The location of the source transmitter 52 for recording A (shown in FIG. 3a) is marked '$A_s$'. The receiver from recording A that is symmetrically located about the selected surface CDP from $A_s$ is the receiver 54 labelled '$A_{23}$.' Similarly, the transmitter 53 source location for recording B is marked '$B_s$' and has a corresponding symmetrically disposed receiver 56 labelled '$B_{21}$' as shown in FIG. 5.

Figure 6:
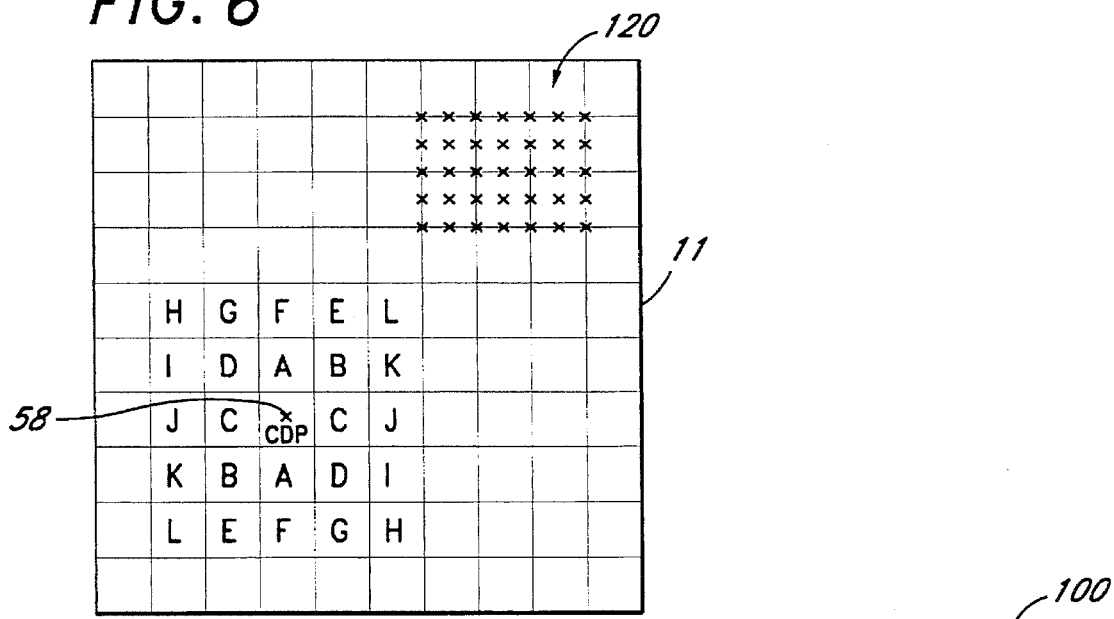
FIG. 6 is a symbolic representation of the sensor array illustrating the array elements used for a full radial CDP gather and the concentration of possible common ground points.

The source-receiver pairs (e.g., $A_s$:$A_{23}$ and $B_s$:$B_{21}$) symmetrically located about each selected surface CDP are located for each recording that contains such a pair. A set of source-receiver pairs around the selected surface CDP 58 shown in FIG. 5 is illustrated in FIG. 6. The corresponding source and receiver pairs for the CDP 58 shown in FIG. 6 are referenced with the same letter. There are two of each letter because the source and receiver can be interchanged. In other words, for two letters that are the same, no designation is made as to which one functions as the transmitter and which functions as the receiver at any given time because they are interchangeable. Also, no letter is shown for the pair where the source and receiver both lie on the selected surface CDP. Thus, a total of 25 source-receiver pair combinations are illustrated in FIG. 6.

However, it should be noted that using a 5 by 5 square of receivers for each recording with the transmitter located in the middle of the 5 by 5 square, only nine source receiver pair traces can be obtained around the surface CDP 58 shown in FIG. 6. The nine traces correspond to two traces from the source-receiver pairs labelled A, B, C, and D, and one trace for the source receiver pair at the surface CDP. Traces for the remainder of the source-receiver pairs (E through L) could be obtained from recordings having a wider range than a 5 by 5 square of receivers. For instance, if a recording was taken with the transmitter located at one of the H's, the 5 by 5 square of receivers around the transmitter would not encompass the other H. A 9 by 9 recording square would be required to obtain a recording which had the transmitter located at one H and a receiver within the 9 by 9 square located at the other H. Accordingly, the extra recordings E through L, which have been included for illustration purpose, would originate from recordings having a wider range than the 5 by 5 square (e.g., a 9 by 9 square or larger) of receivers.

Figure 7:
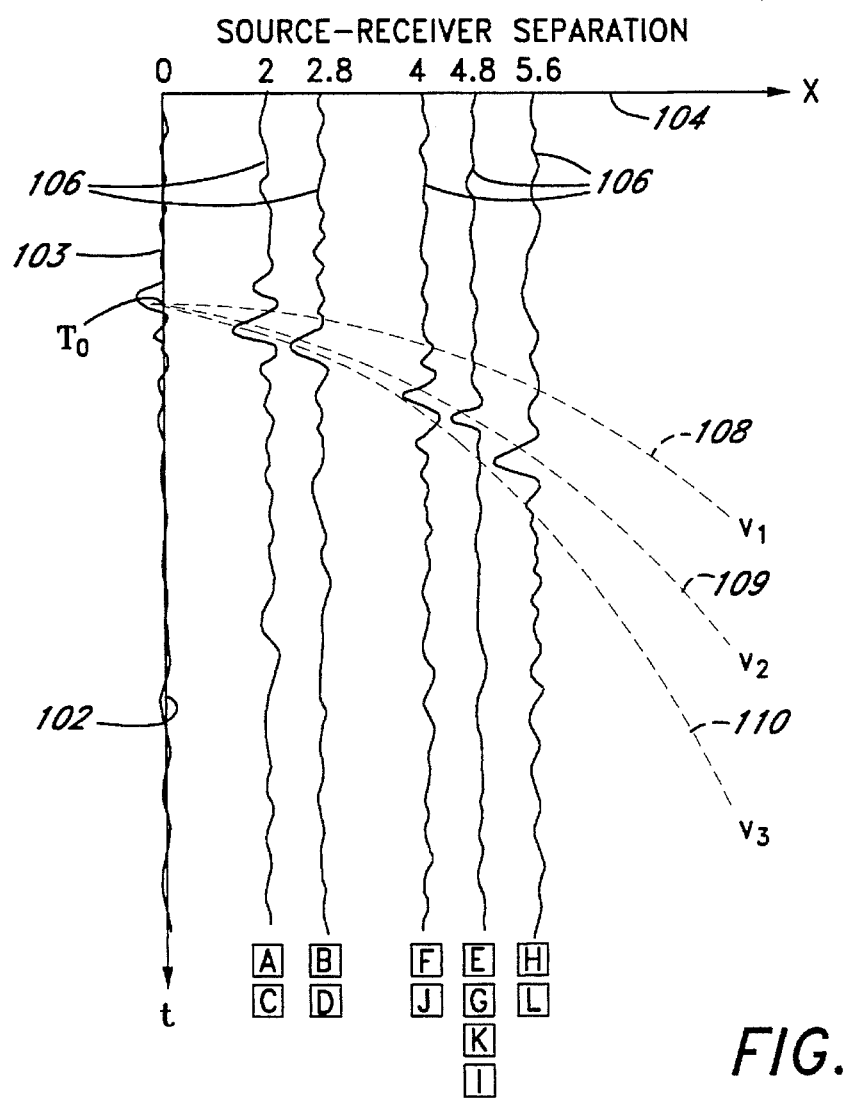
FIG. 7 is a graph representing a simplified radial CDP gather and illustrating how a velocity analysis is performed for a single common depth point.

A representation of twenty-five exemplary receiver traces chosen for the particular surface CDP 58 shown in FIG. 5 are depicted in a graph 100 shown in FIG. 7. One axis 102 of the graph, denoted by t, represents the time at which the signal reached the receiver element. The other axis 104, denoted by x, represents the distance between the source and receiver in the recording from which the traces 106 originated. The traces 106 are represented in system memory and are advantageously identified and accessed according to the recording and receiver element from which they originated. The graph 100 is referred to as the radial CDP gather since the source-receiver pairs are located radially around the CDP. The letters A through L representing the source-receiver pairs in FIG. 6 are shown in FIG. 7 at the bottom of the graph 100. Traces originating from source-receiver pairs which are the same distance apart, i.e., have the same x-value, are summed together before they are entered into system memory for the radial CDP gather. The trace 103 for the coincident source-receiver pair at the location of the surface CDP is plotted at x= 0, along the t axis 102. This is because the source and receiver are at the same location.

The next step in creating the velocity volume is to perform a velocity analysis on the radial CDP gather 100, as represented in an action block 162. Theoretical models and experimental evidence have shown that echoes originating from a common reflector at a given location within the sample will lie approximately along a hyperbolic curve across the traces in the radial CDP gather. Additionally, the apex of the hyperbola lies at x= 0, as depicted in FIG. 7. The path that a sound wave travels from a source to a reflector in the sample and back to a receiver is the same path that it would take if the source and receiver were interchanged, only in reverse. Therefore, the arrival time of the echo on the CDP gather is symmetric around x= 0, or around the trace for the coincident source-receiver pair. The coincident source-receiver pair also corresponds to the least time path to and from the reflector for all of the radial pairs. It should be noted that the reflector may not necessarily be located directly below the surface CDP since it is possible that the first reflection to return may not have traveled along a straight path because of refractions within the sample, but the symmetry in the arrival time still holds.

If an echo from a reflector reaches the first receiver at time $T_0$ on the x= 0 trace 102, then the arrival time $T_x$ at which an echo from the same reflector appears on one of the other traces 106 is given by the equation:

$$T_x^2 = T_0^2 + (X/V_{stacking})^2$$

where X is the source receiver separation and $V_{stacking}$ is the velocity along the path of travel of the sound signal from source to reflector to receiver. The stacking velocity defines the curvature of the hyperbolic curve represented by this equation. Those skilled in the art will understand that $V_{stacking}$ provides a velocity value through the sample. This velocity value is referred to as the stacking velocity in geophysical applications such as seismic imaging.

In the example depicted in FIG. 7, the velocity analysis is performed by searching through the radial gather 100 along various hyperbolic curves (e.g., hyperbolic curves 108, 109, 110) with apexes at x= 0. Many other hyperbolic curves in addition to hyperbolic curves 108, 109, 110 would also be searched. An arrival time $T_0$ is chosen, as shown in FIG. 7, and a hyperbola with a given curvature, or stacking velocity, is also chosen along which to search. The values on all the receiver traces along the chosen hyperbola are compared to other trajectories (e.g., cross-correlated or summed with other receiver traces to find the largest coherent values, as well known in the art). If the data along the hyperbola is highly coherent, the sum produces a high value. The curvature of the hyperbolic curve which results in the highest coherency is taken to represent the stacking velocity at arrival time $T_0$ for the surface CDP.

Figure 8:
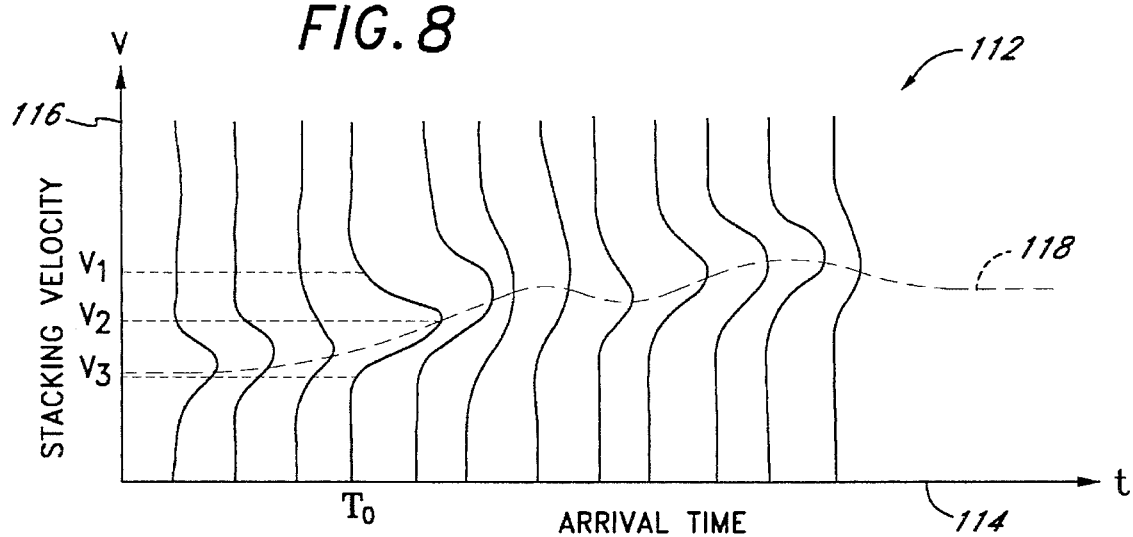
FIG. 8 illustrates an exemplary formulation of a velocity function for a single common depth point.

The determination of velocities at all desired arrival times results in a velocity function with respect to time, depicted in the graph 112 of FIG. 8. In other words, the graph 112 depicts a velocity function 118 in time for a single surface point. Each point in the graph 112 represents a selected hyperbolic curve from the CDP gather. One axis 114 of the graph 112 represents the location of the apex of the hyperbola on the time axis 102 of the CDP gather 100 in FIG. 7. This can be thought of as the arrival time of a reflected signal from the coincident source-receiver pair at x= 0. The other axis 116 represents the curvature of the hyperbola, or equivalently, the stacking velocity. The coherency of each summed hyperbolic curve is represented on the graph 112 by the peaks seen in the direction of increasing arrival time. The dotted curve 118 represents the velocity function, or the best velocity value at each arrival time, which is the peak of the coherency curve along the velocity axis 116. The velocity $V_2$ from FIG. 7 is chosen as the best velocity at time $T_0$ because it has the highest coherency. It should be noted that the three hyperbolic curves 108, 109, and 110 of FIG. 7 only provide the points on the $T_0$ trace indicated by dotted lines labelled $V_1$, $V_2$, and $V_3$. Therefore, as previously explained, many additional hyperbolas are summed to obtain the remainder of the $T_0$ trace, as well as the other traces in the velocity function graph 112.

Multiple coherency peaks may occur due to reverberations and multiple reflections from the sample, but these can be separated from the initial reflections using simple logical inferences about the sample. In other words, certain properties about the sample are generally known. Knowledge of these properties can be used to separate signals containing accurate information from signals representing propagation artifacts such as reverberations. For instance, if the sample is a part of the human body known to have a single bone and returning reflections indicate the presence of two bones, the extra signals can generally be separated as reverberations or propagation artifacts.

Preferably, the CDP gather and velocity analysis are performed to obtain a velocity function (velocity with respect to time) for every surface CDP in the array. Therefore, each surface CDP in the array will have a corresponding velocity function similar to that represented in the graph 112 (FIG. 8). The combination of the velocity functions for each of the surface CDPs results in a velocity volume with each surface CDP location having a velocity function as a function of time. This velocity volume is represented in system memory as velocity functions in time for each surface CDP. The time functions are stored with reference to the position (X,Y) across the array 11 of each surface CDP. Moreover, because the functions are time functions, as seen in FIG. 8, the values in the velocity volume are accessed in reference to the spatial position (X,Y) and the time (t).

Surface CDPs can be located not only at the center of a transducer element, but also halfway between elements and at the corners of four adjacent elements. An example of the surface CDPs for a portion of the array 11, are marked by a set of 'x's 120 in FIG. 6. Radial source-receiver pairs can be found around all of these points.

Since the stacking velocity is an average, it does not change dramatically across the velocity map. Thus, once the velocity volume is calculated for a preliminary set of surface CDPs, the values in the velocity volume may be interpolated to find the stacking velocity value beneath any location on the sensor array. The velocity volume gives general low resolution information about the reflectors in the sample, and therefore, can be interpreted. For instance, if the sample is a portion of the human body with known characteristics, and the velocity volume differs significantly from the known characteristics, the anomalies in the velocity map may provide valuable diagnostic information. In one embodiment, the velocity volume can be used in conjunction with a database to identify the particular types of tissue within the sample. The data base is created by performing the velocity analysis on known sample materials and recording the signatures of these materials within the velocity volume that is obtained. Statistical pattern matching may then be used to identify materials in an unknown sample. A two-dimensional slice through the velocity volume can also be displayed, using conventional methods such as grey-scaling or thresholding, as depicted in a decision block 163, and an action block 164. Alternatively, a two-dimensional projection through the velocity volume can be displayed, as well known in the geophysical sciences.

Along with the velocity volume, the CDP gather 100 of FIG. 7 is used to create a CDP stacked trace for each surface CDP. A stacked trace is a single time history trace for a particular surface CDP and contains the maximum coherency value associated with the velocity chosen from the velocity map. For example, at time $T_0$ marked on the graph 100 in FIG. 7, the best velocity value was chosen to be $V_2$ because the sum across the traces 106 along the hyperbola 109 corresponding to $V_2$ yielded the highest value. This sum is plotted as the CDP stacked trace value at arrival time $T_0$. It is called a "stacked" trace because all of the traces 106 from each of the source-receiver pairs are collapsed into a single trace located at x= 0 (directly below the surface CDP) by summing or stacking them together. This step is represented by an action block 165 in FIG. 12.

Figure 9:
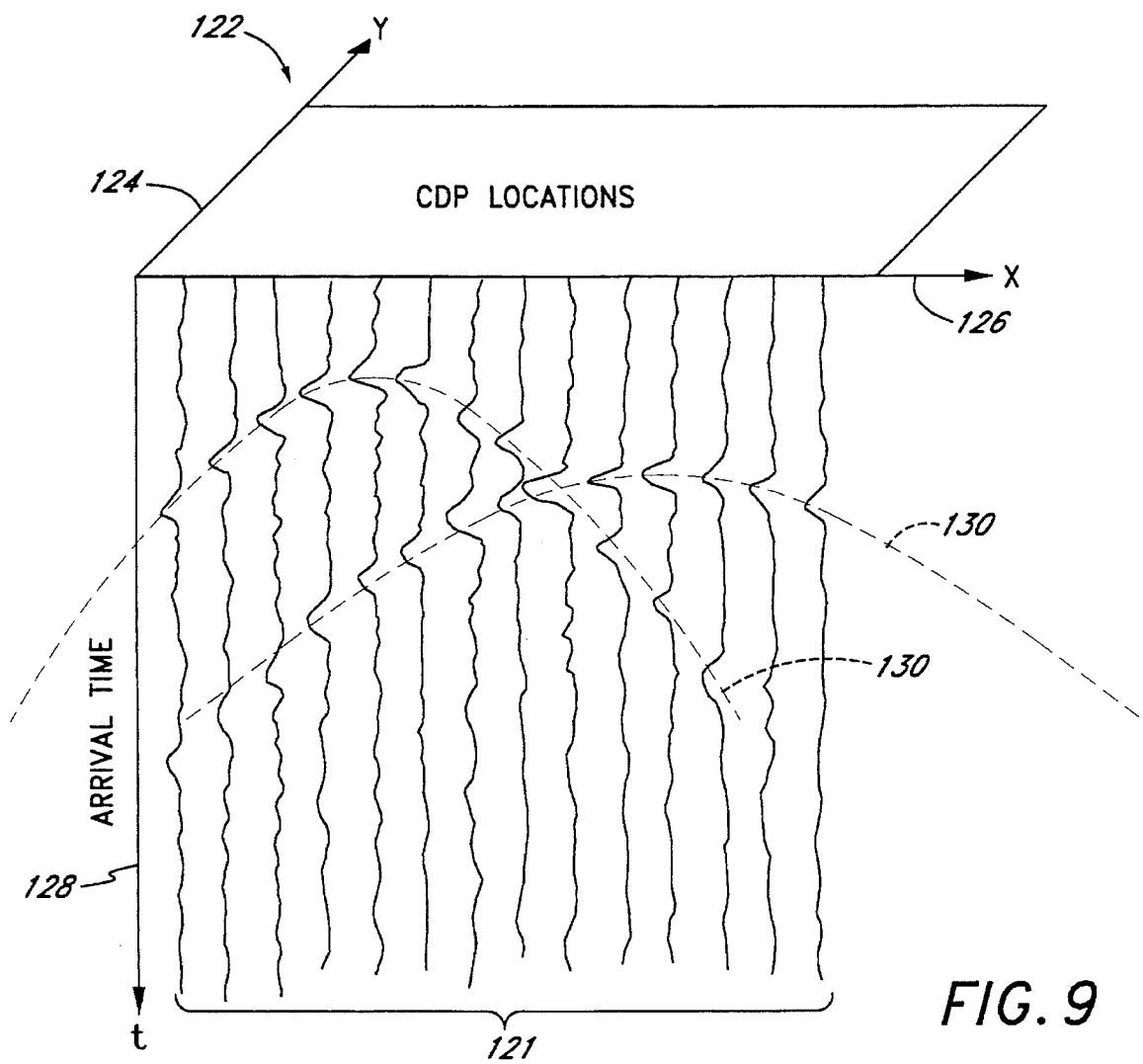
FIG. 9 is a representation of a set of CDP stacked traces and illustrates how a focus volume is obtained.

Advantageously, CDP stacked traces such as the representative traces 121 are obtained for each surface CDP spatial position on the sensor array 11. The stacked traces are stored in system memory with reference to the associated spacial position and time. The compilation of stacked traces in memory for each surface CDP is referred to as a focus volume. The graph 122 of FIG. 9, is an exemplary representation a number of stacked traces 121 stored in memory. The representation 122 a Y axis 124 and an X axis 126 representing the spatial surface position on the sensor array and a t axis 128 representing the arrival time of the signals in the CDP stacked traces 121.

In one embodiment, the focus volume is stored in a three-dimensional array configured in computer memory and accessed with respect to X, Y, and t. Each cell in the array contains a value representing the amplitude of the stacked trace at that point in time. Therefore, in essence, the focus map has four dimensions-the x position, the y position, the point in time, and the amplitude of the trace at that point. CDP stacking is known in the geophysical sciences as disclosed by Wang, et al in U.S. Pat. No. 4,992,996.

As in the CDP gather, the reflections returning from a point reflector at a given location in the sample appear on several adjacent CDP stacked traces in the focus volume along a hyperbolic curve 130. Since the sensor array 11 is substantially two-dimensional, the hyperbolic curves in the focus volume take the form of a three-dimensional hyperbolic surface, or hyperboloid of revolution. Only the traces 121 in a single slice of the focus volume are shown in FIG. 9. The density of the traces has also been reduced for clarity. In practice, there would be one trace for every surface CDP on the array 11.

From the focus volume 122, a three-dimensional image field of values can be formed by summing along the hyperboloid curves 130 at every CDP stacked trace in the focus volume 122. This step, represented in an action block 166 (FIG. 12), is known in geophysics as migration and results in the reflections being more focussed and in more correct spacial positions. If depicted in graphical form, the results of the migration would have a similar representation to the representation depicted in FIG. 9, except that the values would be more accurate. Accordingly, the image field, in essence, also has four dimensions—the X and Y spacial position of the associated CDP for the traces, the time, and the amplitude at that time.

To further illustrate the migration step, suppose a given point in the sample is given the coordinates (x,y,z) where x and y are the coordinates of the surface position on the sensor array beneath which the point is located, and z is the depth. The arrival time is calculated for a reflector at depth z using the information from the velocity map obtained previously. The apex of the hyperboloid curve is assumed to be directly beneath the surface location (x,y) and at the arrival time which corresponds to depth z. The location of the apex of the hyperboloid corresponding to the sample position (x,y,z) can then be represented by the coordinates (x,y,t) in the focus volume 122 where t is the arrival time on the CDP stacked trace below the surface point (x,y). During this phase of the image reconstruction algorithm, it is assumed that the least time path from a reflector to the surface is a straight path which is perpendicular to the sensor array at the surface. For most situations, this assumption does not significantly affect the image reconstruction.

As previously explained, the value in the velocity volume are also accessible by reference to X, Y, and t. Therefore, once the apex of the hyperboloid (x,y,t) is located, the curvature is determined from the stacking velocity located at the corresponding point in the velocity volume in memory. The arrival time $T_R$ of the echo signal from a possible reflector on an adjacent CDP stacked trace 121 can be found by a similar equation to that used in the velocity analysis, namely:

$$T_R^2 = T_0^2 + (R/V_{stacking})^2$$

where $T_0$ is the arrival time at the apex of the hyperboloid, R is the distance along the surface between the CDP stacked trace at the apex and the stacked trace at which the arrival time $T_R$ is being determined, and $V_{stacking}$ is the velocity from the velocity volume which corresponds to the location (in terms of x,y, and t) of the apex of the hyperboloid.

If the apex point (x,y,t) is not directly below a surface CDP, the velocity is obtained by interpolation within the velocity volume. When the curvature is determined, the values along the hyperbola with the identified apex location and curvature are summed together in the same fashion as in the CDP gather. If a reflector is located at the chosen position (x,y,z), the summed values are coherent and result in a large overall value. If no reflector is located at the chosen position, the summed values represent incoherent noise and result in a small value. Stronger reflectors produce higher coherent values simply because more energy returns from strong reflectors.

It should be understood that the representation 122 of the focus volume is significantly simplified from a focus volume stored in memory of a sample with a large reflector within the sample. The focus volume 122 essentially depicts two point reflectors in the sample. For instance, if the sample was a part of the human body with bone within the sample area, the interface between the bone and the surrounding tissue would cause coherent reflections from many (x,y) positions and at substantially the same point on the t axis 128 in the focus volume 122.

Through interpolation within the focus volume 122 to find the apex of the hyperboloids in the volume, a very high resolution image can be obtained. For instance, in the example explained above with a human bone within the sample, the apexes of many of the hyperbolas combined indicate the reflecting surfaces. Moreover, the value obtained by summing along the hyperbola provides further information about the reflectors, as previously explained. Assuming that a sufficiently high sample rate is used for the initial recordings, the resolution is limited by the pulse width (i.e., duration), the pre-processing step mentioned above. Since two reflectors located closely together can only be distinguished if the pulses returning from each do not overlap, with a transmitted acoustic chirp in the megahertz range, it is possible to achieve a resolution on the order of 15 microns by such wavefield reconstruction.

Figure 13:
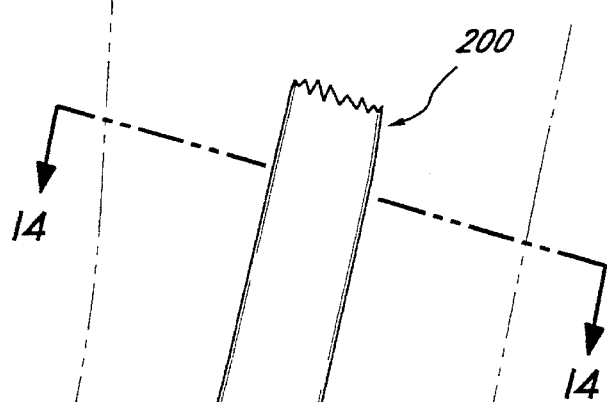
FIG. 13 is a representation of a projection of a femur.

Once a three-dimensional image field has been reconstructed through migration, it can be collapsed into a two-dimensional image (as represented in an action block 168) (FIG. 12) for display on the display monitor 42 (represented in an action block 169. One possible method to collapse the three-dimensional image field into a two-dimensional image is through tomography and is well known both in the art of seismic imaging and medical imaging. A representation of a tomographic view of a femur 200 is depicted in FIG. 13. A tomographic algorithm for a medical imaging system is disclosed in U.S. Pat. Nos. 4,817,434, and 5,005,418, to Anderson, which are incorporated herein by reference. In the present embodiment, the tomographic algorithm may be performed by the display processor 38. The three-dimensional volume is sent to the display processor 38 along with a desired viewing angle supplied by the software program or by the user. The display processor 38 computes the pixel values by summing the coherency values along the line of sight of the desired view and converting the summed values to corresponding grey-scale values or color values using thresholding techniques, as well known in the art. The grey-scaled or thresholded image is displayed on the monitor 42. The pixel values are then accessed by the display controller 40 and output to the monitor 42 for viewing. It is possible for the CPU 12 to execute the display processing in order to reduce hardware costs, but this would slow down the processing time.

Figure 14:
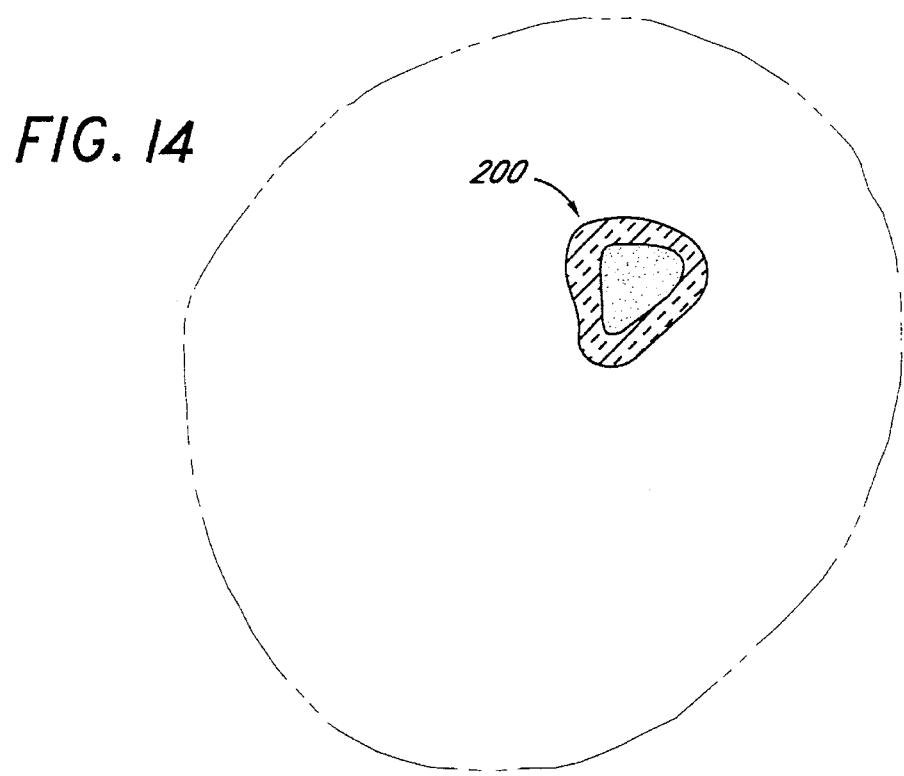
FIG. 14 is a representation of a cross-section of the femur taken along 14—14 in FIG. 13.

A slice through the image field can also be displayed through grey-scaling or thresholding the values in the slice, as well known in the art. Any slice can be imaged. For instance, a slice for a selected time value, or a slice for a particular X or Y value in the field could be taken. FIG. 14 depicts a representation of a slice of the femur 200, which could be obtained by taking a slice through the image field.

Alternatively, with a three-dimensional display 42, the three-dimensional image field (or other three-dimensional representation) could be displayed directly.

As explained above, the stacking velocity is an average. The velocity of the acoustic signals within the sample at different intervals (the "interval velocities") can also be calculated. Calculating interval velocities is well known in the geophysical sciences. One common method to estimate the interval velocities throughout a sample is through the "DIX" equation, as well known in the art. See, Dobrin, *Introduction to Geophysical Prospecting*, p. 244, Fourth Edition, McGraw Hill Book Co. 1988. According to the present invention, the interval velocities within an organism can be calculated, as represented in an alternative path in the flow chart 144 by a decision block 170 and an action block 171. The interval velocities are useful if the velocity at a particular point within a sample is desired. For instance, a velocity within particular tissue which differs from the expected velocity may be useful in diagnosing the character of the anomaly in the tissue.

In the medical field, the two-dimensional images which are displayed would generally be examined by the attending physician. However, because certain properties are known about human tissue, the computer system could execute a variety of different analyses to aid in the interpretation of the images. For instance, in one embodiment, the attendant could select any given point in the sample for analysis by the computer. The computer could calculate the interval velocity at that point and compare the measured velocity to a data base of velocities associated with different anomalies. For instance, if the velocity of a given cancer is known, and the interval velocity for the portion selected by the operator matches the known velocity of the cancer, the computer could easily identify the particular cancer as one possible source for the anomaly. The interpretation of the images for diagnosis is depicted in an action block 172.

There are various enhancements that can be incorporated into the present invention to increase the processing speed. Increasing the speed allows for a faster image frame generation, and therefore, allows a real-time image simulation. One enhancement that may be incorporated is a pipelined processing architecture. Such an architecture could advantageously utilize a set of CPU's, one for each pipeline stage, thus allowing the various stages of processing to be performed simultaneously. The stages that are easily separated are the data acquisition, signal correlation, signal pre-processing, the radial CDP gather, the velocity analysis and CDP stacked trace formation (done simultaneously), the migration algorithm, and the display image projection. Each of these stages transforms the data into a separate format. Therefore, pipelining each of these stages is possible.

Another way to increase speed is to create dedicated hardware units which take the place of software steps used in the processing of the data. Processing steps which are relatively easy to develop as hardware units include the signal correlation, the signal pre-processing, the CDP stacked trace formation, and the image projection which has already been represented as the display processor 38 in FIG. 1.

Another option that can be used to speed up the data acquisition step is to transmit more than one signal simultaneously and thereby take more than one recording at a time. In this option, a small set of transmitters is chosen and chirp signals with different signatures are transmitted from each. When the echoes are recorded, the information from each transmitter is separated during the correlation process by examining the different chirp signatures. This option would require more receiver channels as well as some additional hardware for the pulse generation unit to accommodate simultaneous transmission of signals.

Although the preferred embodiment of the present invention has been described and illustrated above, those skilled in the art will appreciate that various changes and modifications can be made to the present invention without departing from its spirit. Accordingly, the scope of the present invention is deemed to be limited only by the scope of the following appended claims.

What is claimed is:

1. A method of mapping inhomogeneities in tissue comprising the steps of:

transmitting acoustic energy into said tissue from a first plurality of locations;

receiving reflections of said acoustic energy at a second plurality of locations; and reconstructing a wavefield representation with a common depth point velocity analysis of the reflections of said acoustic energy to generate a mapping of said inhomogeneities in tissue.

2. The method of claim 1, further comprising the step of displaying said mapping.

3. The method of claim 1, further comprising the step of generating an image from said mapping.

4. The method of claim 1, wherien said first plurality of locations differs from said second plurality of locations.

5. A method of diagnosing anomalies in human tissue comprising the steps of:

transmitting acoustic energy into human tissue from a plurality of locations;

receiving reflections of said acoustic energy at a plurality of locations; and reconstructing a mapping of the velocity of the acoustic energy in said tissue with a common depth point velocity analysis of the reflections of said acoustic energy; and comparing the velocity in said tissue with the velocity of known anomalies in human tissue.

6. A method of imaging an organism comprising the steps of:

transmitting acoustic energy into a selected portion of the organism from a first plurality of locations;

receiving reflections of said acoustic energy at a second plurality of locations; and reconstructing a mapping of the velocity of the acoustic energy in said selected portion with a common depth point velocity analysis of the reflections of said acoustic energy.

7. The method of claim 6, further comprising the step of displaying said mapping.

8. The method of claim 6, further comprising the steps of:

generating an image from said mapping; and displaying said image.

9. The method of claim 8, wherein said image is two-dimensional.

* * * * *